(12) United States Patent
Irvine et al.

(10) Patent No.: US 9,917,321 B2
(45) Date of Patent: Mar. 13, 2018

(54) DIRECT CARBON ELECTROCHEMICAL CELL

(71) Applicant: University Court of the University of St Andrews, St Andrews (GB)

(72) Inventors: John Thomas Sirr Irvine, St Andrews (GB); Gael Corre, St Andrews (GB); Cairong Jiang, St Andrews (GB)

(73) Assignee: University Court of the University of St Andrews, St Andrews (GB)

( * ) Notice: Subject to any disclaimer, the term of this patent is extended or adjusted under 35 U.S.C. 154(b) by 479 days.

(21) Appl. No.: 14/352,607

(22) PCT Filed: Oct. 25, 2012

(86) PCT No.: PCT/GB2012/052657
§ 371 (c)(1),
(2) Date: Apr. 17, 2014

(87) PCT Pub. No.: WO2013/061067
PCT Pub. Date: May 2, 2013

(65) Prior Publication Data
US 2014/0242493 A1  Aug. 28, 2014

(30) Foreign Application Priority Data

Oct. 28, 2011 (GB) .................................. 1118641.8

(51) Int. Cl.
*H01M 8/10* (2016.01)
*H01M 8/1009* (2016.01)
(Continued)

(52) U.S. Cl.
CPC ....... *H01M 8/1009* (2013.01); *H01M 2/0265* (2013.01); *H01M 2/08* (2013.01);
(Continued)

(58) Field of Classification Search
CPC .... H01M 8/1009; H01M 2/0265; H01M 2/08; H01M 8/0282; H01M 8/1233;
(Continued)

(56) References Cited

U.S. PATENT DOCUMENTS 3,268,365 A * 8/1966 McQuade ............... H01M 8/14
429/451
6,200,697 B1 * 3/2001 Pesavento ............... H01M 4/96
429/414
(Continued)

FOREIGN PATENT DOCUMENTS

CN  102244284 A  11/2011
WO  WO 2006/061639 A2  6/2006

OTHER PUBLICATIONS

Xia "Computational Modelling Study of Yttria-stabilized Zirconia", UCL (University College London), 2010, pp. 1-17.*
(Continued)

*Primary Examiner* — Jonathan Jelsma
*Assistant Examiner* — Rashid Alam
(74) *Attorney, Agent, or Firm* — Alston & Bird LLP

(57) ABSTRACT

A direct carbon fuel cell DCFC system (5), the system comprising an electrochemical cell, the electrochemical cell (10) comprising a cathode (30), a solid state first electrolyte (25) and an anode (20), wherein, the system further comprises an anode chamber containing a second electrolyte (125) and a fuel (120). The system, when using molten carbonate as second electrolyte, is preferably purged with $CO_2$ via purge gas inlet (60).

34 Claims, 10 Drawing Sheets

(51) Int. Cl.

| | | |
|---|---|---|
| *H01M 2/02* | (2006.01) | |
| *H01M 2/08* | (2006.01) | |
| *H01M 8/1233* | (2016.01) | |
| *H01M 8/14* | (2006.01) | |
| *H01M 8/22* | (2006.01) | |
| *H01M 8/2475* | (2016.01) | |
| *H01M 8/248* | (2016.01) | |
| *H01M 12/04* | (2006.01) | |
| *H01M 8/0282* | (2016.01) | |

(52) U.S. Cl.
CPC ....... *H01M 8/0282* (2013.01); *H01M 8/1233* (2013.01); *H01M 8/143* (2013.01); *H01M 8/144* (2013.01); *H01M 8/225* (2013.01); *H01M 8/248* (2013.01); *H01M 8/2475* (2013.01); *H01M 12/04* (2013.01); *H01M 8/145* (2013.01); *H01M 8/146* (2013.01); *H01M 2008/147* (2013.01); *Y02E 60/526* (2013.01)

(58) Field of Classification Search
CPC ...... H01M 8/143; H01M 8/144; H01M 8/225; H01M 12/04
USPC .......................................................... 429/455
See application file for complete search history.

(56) References Cited

U.S. PATENT DOCUMENTS

| | | | |
|---|---|---|---|
| 7,981,563 B2 | 7/2011 | Ong et al. | |
| 2004/0229109 A1* | 11/2004 | Cooper | H01M 8/0612 |
| | | | 429/415 |
| 2004/0247980 A1 | 12/2004 | Beatty et al. | |
| 2006/0019132 A1 | 1/2006 | Lipilin et al. | |
| 2006/0029857 A1* | 2/2006 | Cherepy | H01M 4/02 |
| | | | 429/128 |
| 2006/0234098 A1 | 10/2006 | Gur | |
| 2006/0257702 A1 | 11/2006 | Gur | |
| 2008/0286630 A1* | 11/2008 | Jacobson | H01M 8/0273 |
| | | | 429/404 |
| 2009/0155670 A1 | 6/2009 | Poirot-Crouvezier et al. | |
| 2009/0311570 A1 | 12/2009 | Chou et al. | |
| 2010/0035099 A1* | 2/2010 | Ihara | H01M 4/9016 |
| | | | 429/494 |
| 2011/0195342 A1* | 8/2011 | Luo | B01D 53/228 |
| | | | 429/495 |

OTHER PUBLICATIONS https://www.corrosionpedia.com/definition/896/polarization accessed on Jan. 8, 2017.*

Canadian Intellectual Property Office, Requisition by the Examiner for Application No. 2,853,739, dated Sep. 30, 2016, 4 pages, Canada.

Jiang, Cairong, et al., "Catalysis and Oxidation of Carbon in a Hybrid Direct Carbon Fuel Cell", *Journal of Power Sources*, Nov. 2011, pp. 7318-7322, vol. 196, Elsevier, B.V., Netherlands.

Intellectual Property Office, Search Report under Section 17 for Application No. GB1118641.8, dated Sep. 20, 2012, 1 page, United Kingdom.

International Searching Authority, International Search Report and Written Opinion for International Application No. PCT/GB2012/052657, dated Feb. 13, 2013, 13 pages, European Patent Office, The Netherlands.

Canadian Intellectual Property Office, Requisition by the Examiner for Application No. 2,853,739, dated Jun. 19, 2017, 6 pages, Canada.

Damdar, Sherwin, et al., "Sealing Fuel Cells for Peak Performance", *Advanced Fuel Cell Technology*, Aug. 2011, pp. 8-11, vol. 15, No. 8, Seven Mountains Scientific, Inc., U.S.A.

* cited by examiner

DIRECT CARBON ELECTROCHEMICAL CELL

CROSS REFERENCE TO RELATED APPLICATIONS

This application is a National Stage Application, filed under 35 U.S.C. § 371, of International Application No. PCT/GB2012/052657, filed Oct. 25, 2012, which claims priority to Great Britain Application No. 1118641.8, filed Oct. 28, 2011; the contents of both of which are hereby incorporated by reference in their entirety.

BACKGROUND

Related Field

The present invention relates to an electrochemical cell, such as a fuel cell. Particularly though not exclusively, the invention relates to a direct carbon fuel cell.

Description of Related Art

Carbon fuels have long been used for power generation and there are a wide and abundant range of carbon reserves. Examples of carbon fuels include biomass (e.g. wood, coconut shells), coal, petroleum coke (residue from the distillation process in refineries), pyrolytic carbon and materials derived from municipal waste.

Fuel cells that operate using solid fuel can be capable of providing higher energy densities than fuel cells that operate using gaseous fuel. For example, solid carbon contains a high energy density per unit volume (i.e. 20.0 kWh/L) compared with gaseous and liquid fuels such as methane (4.2 kWh/L), hydrogen (2.4 kWh/L) or diesel (9.8 kWh/L).

In view of the above, direct carbon fuel cells, in which carbon is directly converted to electricity show great promise. The electrical efficiency of carbon fuel cells can reach close to 100% efficiency compared with traditional coal fired power stations, which are generally limited to around 30-40% efficiency. In addition, the carbon oxidation products (i.e. $CO_2$) produced by direct carbon fuel cells are relatively pure compared with the emissions from coal fired power stations, which can include undesirable products such as oxides of nitrogen and sulphur and particulate matter. The relatively purity of the oxidation products allows simpler sequestration without expensive and energy intensive separation and purification processes.

As used herein, direct carbon fuel cells are electrochemical cells in which carbon is used as a fuel that is electrochemically oxidised by an oxidant on the anodes. The use of the term "direct" herein does not mean one elementary reaction step but instead is used as being indicative of direct conversion of the fuel in one process, i.e. without external processes such as cracking. For example, the direct reaction may include gasification and fuel cell reactions in one chamber. Furthermore, although the term fuel cell is used, it will be appreciated that the electrochemical cell need not be continuously replenished with fuel and/or oxidant. It will be appreciated that at least one of the anode and/or the cathode side of the cell may be operated using a batch process or single use process more akin to a battery.

Various types of direct carbon fuel cell are available, such as cells having molten salt electrolytes, cells having electrolytes comprising a solid membrane and cells having a combination of both. In molten salt based cells, carbonates ($CO_3^{2-}$) or hydroxides ($OH^-$) are the major oxidant ions, whereas in solid electrolyte systems, oxygen anions such as $O^{2-}$ are the major oxidant.

Many molten salt systems suffer from problems associated with corrosion. Cells in which the electrolyte is entirely solid state can suffer from mass transport issues due to a reduction in the contact between the solid oxide electrolyte and the fuel.

Examples of direct carbon fuel cells are described in WO2006/061639 and US2006/0019132, which describe cells having solid electrolytes and anodes that comprise a fuel and a liquid electrolyte.

In an ideal anode reaction of a direct carbon fuel cell comprising a solid oxide electrolyte, carbon is directly oxidised to carbon dioxide as follows:

$$C+2O^{2-} \rightarrow CO_2+4e^-$$

However, the actual anode reactions may be more complicated. For example, a partial oxidation of carbon to carbon monoxide is also possible:

$$C+O^{2-} \rightarrow CO+2e^-$$

These reactions require a solid/solid interaction, as $O^{2-}$ ions are supplied from the solid electrolyte. However, direct carbon fuel cells that also have a molten carbonate electrolyte may enhance the reaction, as the molten carbonate may act as a mediator as follows:

$$C+2CO_3^{2-} \rightarrow 3CO_2+4e^-$$

$$C+CO_3^{2-} \rightarrow CO+CO_2+2e^-$$

These reactions can be followed by regeneration of the carbonate ions as follows:

$$CO_2+O^{2-} \rightarrow CO_3^{2-}$$

The carbon can also be converted via a non electrochemical reaction known as the reverse Boudouard reaction:

$$C+CO_2 \rightarrow 2CO$$

The carbon monoxide generated in some of the above reactions can be converted into electric power via the electrochemical oxidation of carbon monoxide at the anode of the direct carbon fuel cell as follows:

$$CO+O^{2-} \rightarrow CO_2+2e^-$$

Although the direct carbon fuel cell systems described above show good promise, at least one object of the present invention is to improve the performance of direct carbon fuel cell systems and/or minimise or eliminate at least one problem in direct carbon fuel cell systems, particularly with respect to producing commercial or scaled up systems.

In particular, at least one object of at least one embodiment of the present invention is to provide an improved direct carbon fuel cell system that is capable of providing a high power density from carbon based fuel sources, including widely available waste products, and thereby provide a practical system that achieves competitive performance and durability.

BRIEF SUMMARY

According to the present invention, there is provided an electrochemical system for producing electricity, the system comprising an electrochemical cell, the electrochemical cell comprising a cathode, a solid state first electrolyte and an anode, wherein, the system further comprises an anode chamber for receiving a second electrolyte and a fuel.

The system may comprise or be comprised in a direct carbon fuel cell system.

The system is operable or configured to be operated at a temperature range of between 600 and 850° C. In contrast, conventional direct carbon fuel cell systems that comprise a solid electrolyte are typically used at temperatures up to 1000° C.

The system may comprise or be comprised in a hybrid fuel cell system. The second electrolyte may preferably be at least partially molten under operating conditions, for example, in the range 600 to 850° C. The electrolyte may comprise a molten salt under operating conditions. The fuel may be solid and may be in powdered or granular form. The fuel may be at least partially disposed in the second electrolyte.

The first electrolyte and/or anode and/or cathode may be provided using a thin film process. The electrolyte may be a thin film electrolyte supported upon a thicker electrode, typically anode. The electrolyte may be less than 50 µm thick, and preferably less than 10 µm thick. An anode support of 0.2-1 mm thick might be typical.

The anode chamber may be at least partially defined by an anode housing. The anode housing may comprise at least one anode chamber wall, which may define a hollow structure, such as a cylinder. The anode chamber may be at least partially closed, for example, by a closing member that may extend from the at least one anode chamber wall. The anode housing may define an aperture. The aperture of the anode housing may be closed or closable by the electrochemical cell, which may be such that the anode chamber is defined by the at least one anode chamber wall, the closing member and the electrochemical cell.

The anode chamber may comprise at least one gas inlet and/or outlet, for example, for supplying and/or exhausting purge gas. The system may be configured to provide purge gas comprising or consisting of carbon dioxide or inert gas, such as helium, argon or nitrogen or containing steam to assist in gasification.

The at least one anode chamber wall and the closing member of the anode housing may be integrally formed. The anode housing may advantageously be formed from or comprise stainless steel, such as SS316 grade stainless steel. The anode chamber may optionally be formed from or comprise a ceramic material such as alumina.

The anode chamber may be provided with at least one and preferably a plurality of support members for supporting the electrochemical cell. The support members may extend from the closing member and/or the at least one chamber wall. The support members may be integral with the closing member and/or the chamber wall. The support members may comprise pillars. The support members may extend to a position substantially level or planar with the aperture defined by an end of the anode chamber wall, i.e. a part of the anode chamber wall closest to the electrochemical cell. In use, the support members may be arranged to contact, support and/or apply pressure to the electrochemical cell in at least one operating condition of the system. The provision of such support members may prevent deformation of the electrochemical cell.

The system may comprise an anode chamber seal. The anode chamber seal may be provided on a distal face of the anode chamber walls (i.e. a face of the anode chamber wall closest to the electrochemical cell). In this way, the anode chamber seal may be provided or providable between the anode housing and the electrochemical cell. The anode chamber seal is preferably planar and may be shaped to compliment the end of the anode chamber wall, for example, in the form of a ring.

The anode chamber seal may comprise at least first and second seals.

An anode side current collector may be provided on the anode side of the electrochemical cell, for example, in or proximate the anode chamber. The anode side current collector may comprise a metal wire and/or mesh, for example, a nickel mesh or a silver mesh. The anode side current collector may comprise one or more substantially planar sheets of mesh. An electrical connector may extend from the anode side current collector, and may extend between at least the first and second anode seals, so as to extend externally from the anode chamber to allow electrical connections to the anode side current collector to be made. The anode side current collector may be fixed between the at least one anode chamber wall and the anode of the electrochemical cell and preferably also sealed between portions of the first and second anode seals.

The anode housing may be mounted or mountable to a cathode housing such that the electrochemical cell is provided, fixed and/or clamped between the anode housing and the cathode housing, with the solid anode being provided toward the anode housing and the cathode being provided toward the cathode housing.

It will be appreciated that the electrochemical cell may comprise at least one support substrate and/or interconnect layer.

The cathode housing may comprise one or more openings, for example, for admitting and/or expelling an oxidant such as air and/or oxygen. The openings may form a gas flow pattern. The cathode chamber may be formed from stainless steel, such as stainless steel 316.

The cathode chamber may be provided with a cathode side current collector. The cathode side current collector may comprise a metal wire or mesh, such as a silver or stainless steel mesh and preferably a silver coated stainless steel mesh. Silver coating the current collector may improve the oxidation resistance of the cathode side current collector.

A connector may be provided between the cathode and the cathode side current collector. The connector may comprise a tape and/or paste. The connector may comprise a cathode material, such as a solid oxide, for example, Lanthanum Strontium Manganite (LSM). The tape may be between 200 and 400 µm thick. Provision of the tape between the cathode and the cathode side current collector may improve the current collection from the cathode.

A cathode side seal may be provided between the cathode of the electrochemical cell and the cathode housing. The cathode side seal may comprise at least two and preferably at least three cathode seals. At least the first cathode seal may be provided between the cathode and the cathode side current collector. At least one and preferably at least two second cathode seals may be provided between the cathode side current collector and the cathode housing.

The anode chamber seal and/or cathode side seal may comprise electrically insulating seals. The anode chamber seal and/or cathode side seal may comprise a mineral seal. The anode chamber seal and/or cathode side seal may comprise at least one of steatite, vermiculite and/or a vermiculite derivative, such as exfoliated vermiculite, for example thermally and/or chemically exfoliated vermiculite. The anode chamber seal and/or cathode chamber seal may preferably be polymer free. Seals comprising these materials have been found to be especially suitable for use in direct carbon fuel cells, being capable of providing a stable seal at high operating temperatures (e.g. 600 to 850° C.) and were found to be resistant to degradation by the carbonates of the second electrolyte under operating conditions. The sealing arrangement described above also helps overcome problems associated with thermal expansion mismatch, for example between the anode and/or cathode housings and the electrochemical cell.

In an alternative or additional embodiment, at least one of the above seals may comprise a ceramic and/or a ceramic adhesive.

The system may be compression sealed or sealable. For example, at least one and preferably at least two bolt holes may be provided in the anode and/or cathode housings. Preferably, at least four bolt holes may be provided. The bolt holes may be provided in opposing pairs. A sleeve of electrically insulating material, such as an alumina tube, may be provided or providable in at least one and preferably each bolt hole, such that the insulating sleeves are located between the anode and/or cathode housing and any bolts provided in the bolt holes. In this way, a sufficient compression force can be applied between the anode and cathode housings using bolts, whilst short circuiting of the cell is prevented by the insulating sleeves. The compression sealing arrangement described above has been found to be especially suitable for preventing leaks.

The electrochemical cell may comprise a planar cell. The system may be configured to be provided with a plurality of similar systems to form a stack.

The anode and/or cathode may be solid state under operating conditions. At least one of the anode, electrolyte and/or cathode may comprise a solid oxide material.

The cathode may comprise at least one solid state metal oxide, such as lanthanum strontium manganite (LSM), lanthanum doped strontium cobalt oxide (LSC) or a mixed ionic/electronic conducting ceramic with the formula $(A_{1-x}Sr_x)_{1-y}BO_{3-\delta}$, where A may be lanthanum or barium, and B may be manganese, iron, cobalt or a combination thereof. The cathode may comprise yttria stabilised zirconia (YSZ) in addition to at least one of the above cathode materials.

The system may comprise an interlayer, which may be on or adjacent the cathode. The interlayer may be provided between the cathode and the first electrolyte. The interlayer may have a material composition that differs from both the first electrolyte and cathode. Use of such an interlayer may allow use of optimum cathode and electrolyte materials by preventing reaction between the cathode and first electrolyte. An example of a suitable material that may be used in the interlayer is gadolinium doped ceria.

The solid anode may comprise a solid state metal and/or metal oxide, such as nickel, platinum, palladium, zinc, iron or ceria. The metal oxide may be reduced in situ by the carbon fuel. Suitable examples of anode materials include composite nickel oxide and YSZ, nickel cermet.

The first electrolyte may comprise a solid metal oxide conducting oxygen ions, such as hafnia, zirconia, alumina, yttria, ceria, lanthanum gallate, or the like.

The first electrolyte may preferably and advantageously comprise a yttria stabilised zirconia and may have a cubic crystal structure.

The second electrolyte may be molten under operating conditions. The second electrolyte may comprise any of the following metal hydroxides/carbonates: lithium hydroxide, sodium hydroxide, potassium hydroxide or mixture thereof; lithium carbonate, sodium carbonate, potassium carbonate or mixture thereof. Preferably the second electrolyte may comprise a blend of lithium and potassium carbonates in a 62:38 mol % ratio.

The anode chamber may contain or be configured to receive a solid fuel material, such as a carbonaceous fuel. The fuel may be in particulate or powder form, such as micro or nano particulate form. The fuel may comprise, for example, pyrolysed medium density fibreboard (p-MDF), coal, coke, graphite, carbon black, activated carbon, or the like.

The electrochemical cell system may be operable using, and/or the anode chamber may contain or be configured to receive, the fuel and second electrolyte in at least a 1:1 weight ratio, preferably at least a 2:1 weight ratio and most preferably at least a 4:1 weight ratio. For example, the second electrolyte may be advantageously provided at 25 wt % or less relative to the fuel. The electrochemical cell system may be operable and/or the anode chamber may contain or be configured to receive the fuel and second electrolyte at a mole ratio of at least 80:20, preferably greater than 90:10 and most preferably at least 95:5, such as 97:3. The amount of second electrolyte may be at least one of: (a) less than or equal to 20 mol %; or (b) less than 1:1 weight ratio relative to the fuel.

The anode chamber may contain or be configured to receive a catalyst, which may be in particle or powdered form. The catalyst may comprise a metal such as nickel. Other examples of materials that may be used as catalysts include platinum, palladium, copper and/or iron. At least 10 wt % of catalyst to electrolyte and preferably at least 25 wt % may be provided.

The anode chamber may be provided with an agitator, stirrer or the like or be subject to sonification.

The system may comprise a feeder for feeding fuel and/or second electrolyte to the anode chamber.

The system may be operable as or comprised or comprisable in a fuel cell.

The system may be operable as or comprised or comprisable in a battery.

According to a second aspect of the invention is a stack or assembly comprising at least two systems of the first aspect. The at least two systems may be linked by a common fuel supply and/or exhaust and/or a common oxidant supply and/or exhaust and/or be electrically connected.

According to a third aspect of the present invention is an anode housing for use with the system of the first aspect.

The anode housing may define an anode chamber. The anode housing may comprise at least one chamber wall, which may be at least partially closed, for example by a closing member that may extend from the at least one chamber wall to at least partially close an end of the housing. The anode chamber may comprise an open end.

The anode chamber may be provided with at least one and preferably a plurality of support members for supporting an electrochemical cell. The support members may extend from the closing member and/or the at least one chamber wall. The support members may be integral with the closing member and/or the chamber wall. The support members may comprise pillars. The support members may extend to a position substantially level or planar with an open end of the anode housing.

The anode chamber may comprise an anode chamber seal, which may be provided at a peripheral end of the chamber walls, e.g. at an open end of the anode housing, such as an end opposite the closing member. The anode chamber seal is preferably planar and may be shaped to compliment the peripheral end of the anode chamber wall, for example, it may be ring shaped.

The anode chamber seal may comprise at least first and second anode seals.

The anode seals may comprise a mineral seal. The anode seals may comprise steatite, vermiculite and/or a vermiculite derivative, such as exfoliated vermiculite, for example thermally and/or chemically exfoliated vermiculite. The anode chamber seals may preferably be polymer free.

According to a fourth aspect of the present invention is a method of assembling a direct carbon fuel cell system of the first aspect, the method comprising compression sealing an electrochemical cell between an anode chamber of the third aspect and a cathode housing, wherein at least one seal is provided between the anode chamber and/or the electrochemical cell and/or the cathode chamber.

The seal may comprise at least one feature of the seals described in relation to any of the other aspects of invention.

According to a fifth aspect of the present invention is a method of operation of an electrochemical cell of the first aspect or stack or assembly of the second aspect in order to produce electrical power.

The method may comprise connecting the electrochemical cell and/or stack or assembly to an electrical load and/or supplying fuel to the anode chamber and/or oxidant to the cathode.

The method may comprise supplying purge gas to the anode chamber. The purge gas may comprise nitrogen or argon but preferably comprises or consists of carbon dioxide.

Features analogous to those described in relation to any of the above aspects may be applicable to any of the other above aspects. Method features analogous to those described above in relation to an apparatus and/or apparatus features analogous to those described above in relation to a method may also be provided.

BRIEF DESCRIPTION ON THE FIGURES

Various aspects of the invention will now be described by way of example only and with reference to the accompanying drawings of which:

DETAILED DESCRIPTION OF VARIOUS EMBODIMENTS

Figure 1:
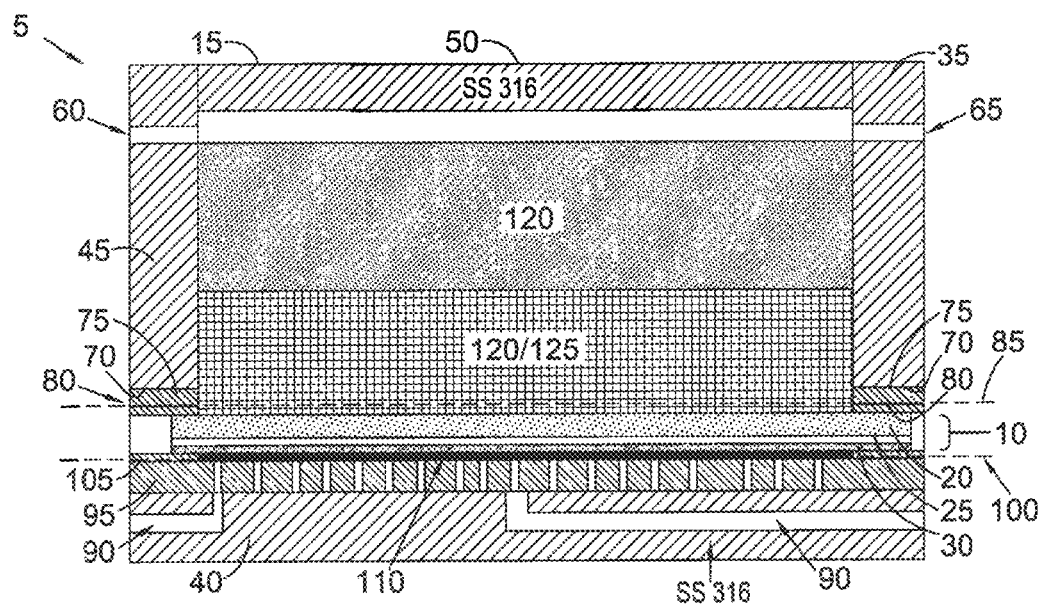
FIG. 1 is an electrochemical cell according to an embodiment of the invention.

FIG. 1 shows a cross section of a direct carbon fuel cell system 5. The system 5 comprises a solid oxide electrochemical cell 10 provided within a cell housing 15. The electrochemical cell 10 comprises a solid oxide anode 20, an ionically conducting solid oxide electrolyte 25 and a solid oxide cathode 30.

Figure 2:
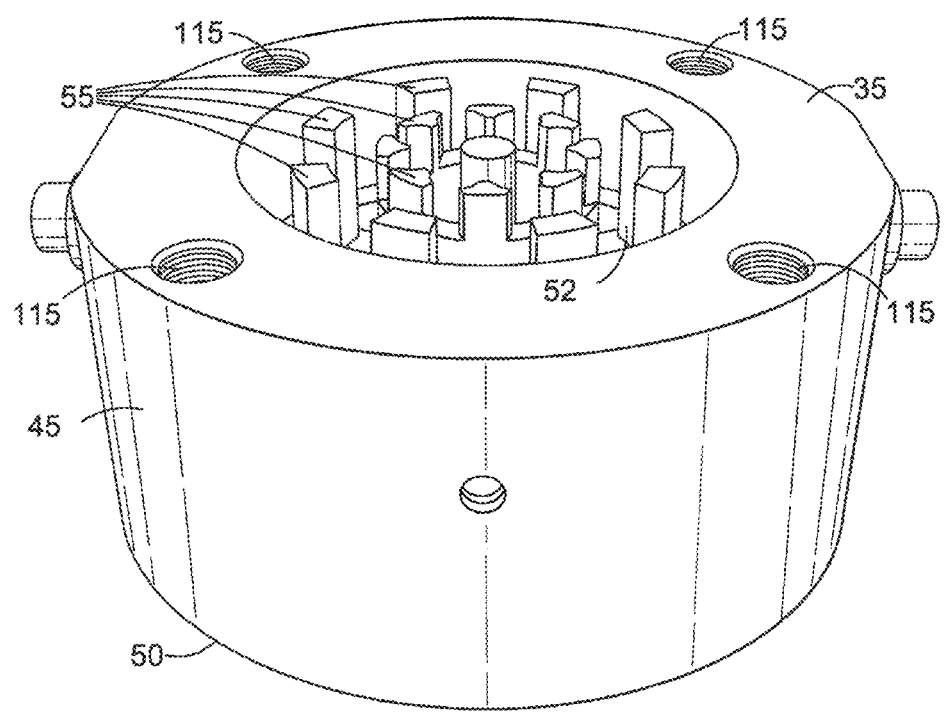
FIG. 2 is an anode chamber of the electrochemical cell of FIG. 1.
Figure 3:
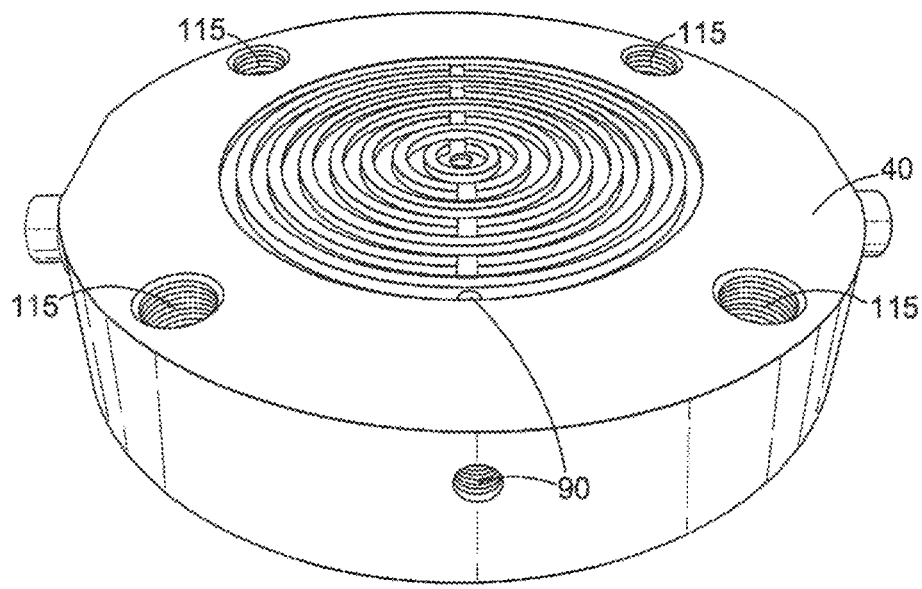
FIG. 3 is a cathode chamber of the electrochemical cell of FIG. 1.

The housing 15 comprises two non-identical parts 35, 40, as shown in FIGS. 2 and 3, namely an anode housing 35 and a cathode housing 40 that are compression sealable together so as to sandwich the cell 10 between them, with the anode 20 of the cell 10 facing the anode housing 35 and the cathode 30 of the cell 10 facing the cathode housing 40. In use, the cell 10 is arranged such that the anode housing 35 forms an upper end or top of the system 5 and the cathode housing 40 forms a lower end or bottom of the system 5. The anode housing 35 is larger than the cathode housing and is configured to hold a mixture of fuel, catalyst and a second electrolyte that is molten at operating temperatures.

An anode side current collector 85 is provided adjacent to the anode 20 and a cathode side current collector 100 is provided adjacent to the cathode 30. A plurality of electrically insulating seals 75, 80, 95, 105 are provided between the anode housing 35, the electrochemical cell 10 and the cathode housing 40 such that the electrochemical cell 10 contacts only the seals 80, 105 and the current collectors 85, 100.

In the particular electrochemical cell 10 illustrated in FIG. 1, the anode 20 comprises Ni doped yttria stabilised zirconia (Ni-YSZ). The thin film electrolyte 25 is formed from YSZ and is disposed on the anode. The thin film cathode 30 comprises lanthanum strontium manganite (LSM) or a LSM/YSZ composite and is provided on the electrolyte.

The anode 20 and cathode 30 are more porous and less dense than the electrolyte 25. An example of a suitable anode composition is 60 wt % of nickel oxide and 40 wt % YSZ and an example of a suitable cathode composition is 50 wt % LSM and 50 wt % YSZ. In the present example, the anode 20 is 1 mm thick and the electrolyte 25 is 5 μm thick. However, it will be appreciated that these dimensions and compositions may be varied or replaced by other suitable solid oxide cell arrangements known in the art. Such thin film cells 10 can be produced by techniques known in the art, such as slurry coating and/or screen printing.

Although the cell 10 can be planar or cylindrical, the preferred cell configuration for the embodiment illustrated herein is planar. According to various embodiments, the cell 10 can be either an anode supported cell or an electrolyte supported cell, wherein the supporting component is generally made thicker in order to impart additional mechanical integrity to the cell. However, the cell 10 illustrated in FIG. 1 is advantageously an anode supported cell. Furthermore, although the cell 10 can be provided in any suitable shape according to the application, such as square or rectangular, in the embodiment described herein, the cell 10 is circular The housing 15 is formed from stainless steel, such as stainless steel grade 316.

The anode housing 35 is in a generally cylindrical form and comprises an anode housing wall 45 in the form of a hollow cylinder and is closed at a first (proximate) end by an end wall 50 of the anode housing. The cell 10 is provided at a second (distal) end 70 of anode housing wall 45 that is opposite to the end wall 50, so as to close the second (distal) end. In this way, the anode housing wall 45, end wall 50 and cell together define an anode chamber 52.

As shown in FIG. 2, a plurality of discrete support pillars 55 extend from the end wall 50 of the anode housing 35 into the anode chamber 52 such that their distal ends are level or coplanar with the second (distal) end 70 of the anode chamber wall 45 that is adjacent the cell 10. In the present embodiment, a central pillar 55 is provided in the centre of the anode chamber 52 and a plurality of further pillars 55 are arranged in one or more concentric circles around the central pillar 55. In this way, when the system 5 is assembled, the pillars 55 may apply pressure on the cell 10 and/or provide additional mechanical support to the cell 10 in at least one operational condition of the cell.

In this embodiment, the anode chamber walls 45, the end wall 50 of the anode housing 35 and the pillars 55 are integrally formed, being advantageously machined from a single part so as to minimise sealing requirements and reduce the opportunity for leakage. However, in alternate embodiments, the anode housing 35 may be formed from two or more separate parts.

A purge gas inlet 60 and purge gas outlet 65 are provided in the anode housing 35 close to the end wall 50. In this way, purge gas can be provided to the anode chamber 52. The purge gas may be, for example, carbon dioxide, nitrogen or argon. Advantageously, it has been found that purging the anode chamber 52 with carbon dioxide may increase the energy output of the system 5 compared to the situation where nitrogen purge gas is used. The rate at which purge gas is supplied depends on the size of the anode chamber 52 and the operating conditions but may be, by way of example only, approximately 20 ml/min.

Although not shown, it will be appreciated that the anode housing 35 may be provided with a fuel inlet and/or outlet to provide fresh fuel to the anode chamber 52 on demand, for example, in a continuous or semi-continuous process. However, it will be appreciated that the system 5 can also be configured for use in a batch mode or as a single use system, akin to a battery, wherein the system 5 is run until the fuel is used. In batch mode, the fuel can be replenished or replaced periodically. The system 5 shown in FIG. 1 and the experimental results described herein relate to batch operation by way of example only.

The end 70 of the anode housing wall 45 that is proximate to the cell 10 at the second (distal) end of the anode housing 35 is provided with first and second seals 75, 80, each of the first and second seals 75, 80 of the anode housing 35 comprising a layer formed from electrically insulating, polymer free chemically exfoliated vermiculite and steatite, for example, as commercially available under the trade name Thermiculite® 886 from Flexitallic. Advantageously, in an embodiment, each sealing layer has a thickness in the range of 300 μm to 1 mm. Each seal 75, 80 is provided in a ring shape to compliment the shape of the distal end 70 of the anode housing walls 45.

The anode side current collector 85 comprises a sheet of expanded Nickel mesh located at the open second end 70 of the anode housing 35 facing the cell 10 so as to be at least partially supported by the seals 75, 80. An electrical connector extends from the anode current collector 85 out of the anode chamber 52 between the first and second anode seals 75, 80 to allow external electrical connections to be made. The anode current collector 85 is provided adjacent the anode 20 and a part of the current collector is supported between inner portions of the first and second seals 75, 80 so as to preventing leakage of liquid electrolyte.

As shown in FIGS. 1 and 3, the cathode housing 40 is provided with airflow channels 90 that define an air inlet and an outlet that direct air flow to and from the cathode 30. A fourth seal 105 comprising two sealing layers is provided between the cathode housing 40 and the cathode 30, each sealing layer comprising a mineral based material (for example as described in relation to the first and second anode seals). The fourth seal 105 defines openings that allow airflow between the airflow channels 90 in the cathode housing 40 and the cathode 30 whilst preventing air escaping from the sides of the system 5 through the seal 105.

The cathode side current collector 100 comprises a silver coated stainless steel expanded mesh and is provided adjacent the fourth sealing layer 105. The silver coating prevents corrosion of the cathode side current collector 100, which may otherwise increase the resistance of the current collector 100. A third seal 95 comprising a mineral based ring shaped sheet that defines an aperture is provided between the cathode side current collector 100 and both the cathode 30 of the electrochemical cell 5 and the second seal 80 on the anode side. The composition of the third seal 95 is as described above in relation to the first and second anode seals. The third seal is shaped and sized to seal around the periphery of the cell 10. The cathode side current collector 100 at least partially extends over the area defined by the aperture of the third seal 95 and a portion of the cathode side current collector is supported between the third and fourth seals 95, 105. An electrical connector extends from the cathode side current collector 100 out of the housing 15 between the third and fourth seals 95, 105 to allow electrical connections to a load to be made.

A layer of conductive tape 110 is provided in the aperture defined by the third seal 95 and extends between the cathode side current collector 100 and the cathode 30, such that the tape 110 functions as a conductive interconnect. The tape 110 comprises cathode material (in this case LSM) and is, for example, around 300 microns thick.

Both the anode housing 35 and the cathode housing 40 are provided with complimentary bolt holes 115. The bolt holes 115 are provided with insulating sleeves (not shown), such as alumina tubes, such that bolts (not shown) can be passed through the insulating sleeves and bolt holes 115 in both the anode and cathode housings 35, 40 in order to compression seal the cell 10 between the anode and cathode housings 35, 40 and the seals 75, 80, 95, 105.

As an example of the preparation of a suitable anode supported electrochemical cell, nickel oxide and YSZ in a 60:40 weight ratio are mixed by ball milling and used to form a 1 mm thick anode. A slurry of YSZ that has been ball milled with an organic solution, binder and a polymer is coated onto the anode substrate. The half cell comprising the anode and solid electrolyte is sintered, for example, at 1350° C. for 5 hours. The LSM cathode is then screen printed on the solid electrolyte. Optionally, the anode and cathode can be partially coated with a silver paste.

Figure 4:
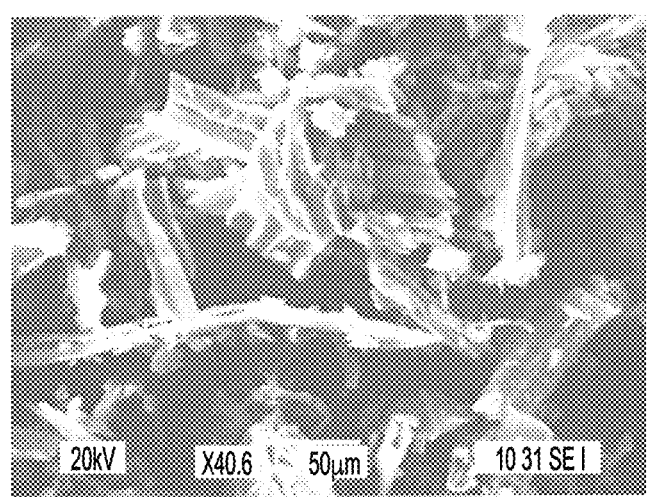
FIG. 4 is a scanning electron micrograph of p-MDF as an example of a fuel for use in the electrochemical cell of FIG. 1.

In this example, a solid fuel 120 in the form of particulate carbon, and more specifically, pyrolysed medium density fibreboard (p-mdf) is provided in the anode chamber 52. In this specific example, the p-mdf is provided as a blend of three particle sizes (10, 15 and 20 mesh) in roughly equal amounts. A scanning electron micrograph of the p-mdf particles is shown in FIG. 4.

The molten electrolyte 125 comprises carbonates that are molten at the operating temperatures of the system 5 (e.g. between 600 and 800° C.). In this specific example the liquid electrolyte 125 is a eutectic mix of lithium carbonate and potassium carbonate in a 62:38 mol % ratio. The material that will be melted to form the molten electrolyte 125 was prepared by mixing the carbonates in the required ratios and then ball milling in acetone.

The anode chamber is initially provided with a mixture of the material for the molten electrolyte 125 and fuel 120 by mixing 80 mol. % of the fuel to 20 mol. % electrolyte. 25 wt. % (relative to the electrolyte) of nickel metal power is also provided in the liquid electrolyte/fuel mixture in order to promote catalytic activity. The fuel/electrolyte/catalyst mixture is poured into the anode chamber 52 so as to contact the anode 20 and the anode chamber 52 is topped up to a level just below the purge gas inlet 60 and outlet 65 with additional fuel 120 such that the electrolyte/fuel/catalyst mixture was provided adjacent the anode 20 with excess fuel 120 being provided above the electrolyte/fuel layer. A space for accommodating purge gas is left above the excess fuel 120.

It will be appreciated that, in use, the system 5 is combinable with a plurality of similar systems 5 repeated in series to form a stack, as is known in the art. Furthermore, the system 5 is provided with ancillary and environmental control apparatus (not shown) such as heaters, heat exchangers, cooling systems and the like, as is known in the art. The system 5 is operated using a controller (not shown), for example, for controlling at least one of the electrical output, supply of fuel and/or oxidant, purge gas supply and heat control.

As a demonstration of system performance, examples of operational data using the cell described above in a batch mode are provided herewith.

Electrochemical measurements were performed using a 4 wire measurement configuration.

The anode chamber 52 was flushed with nitrogen at room temperature to remove any oxygen. The system 5 was heated up to 500° C. at a ramp rate of 0.7° C./min and thereafter heated up to 600° C. at 2° C./min. A flow of air was supplied to the cathode.

Figure 5:
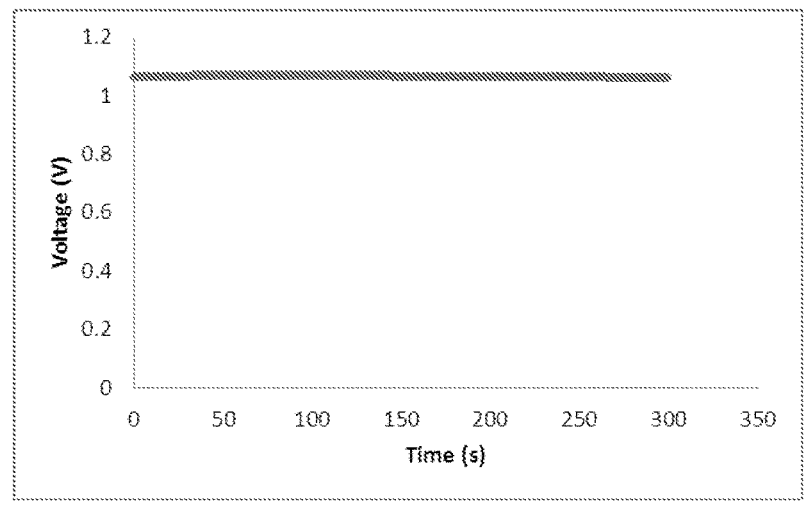
FIG. 5 is a plot of the Open Circuit Voltage of the cell of FIG. 1 with time.

FIG. 5 shows the open circuit voltage (OCV) of the system recorded at 800° C. with no gas flow in the anode chamber 52, showing that a stable OCV is achieved. Nitrogen flow in the anode chamber induces a slight decrease in the cell voltage. However, it is clear that OCVs in excess of 1V are obtainable. The addition of the nickel catalyst in the carbonate melt increases the OCV.

Figure 6:
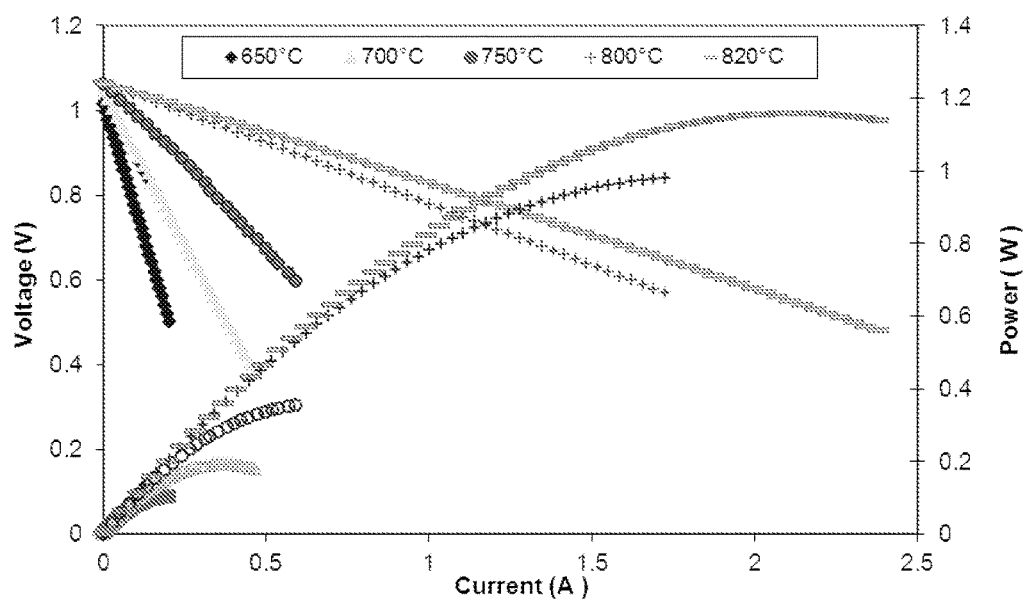
FIG. 6 shows polarisation and power density plots for the cell of FIG. 1 over a range temperatures.

FIG. 6 shows polarisation curves and associated power densities obtained from the system 5 at different temperatures in the range from 650 to 820° C. The maximum power density was 72 mW/cm$^2$, maximum power exceeds 1 W (in the case of a cell having a surface area of 16 cm$^2$) and was obtained at 770° C. It can be seen from FIG. 6 that the OCV increases with temperature. For each temperature tested, the OCV was above 1V.

Figure 7:
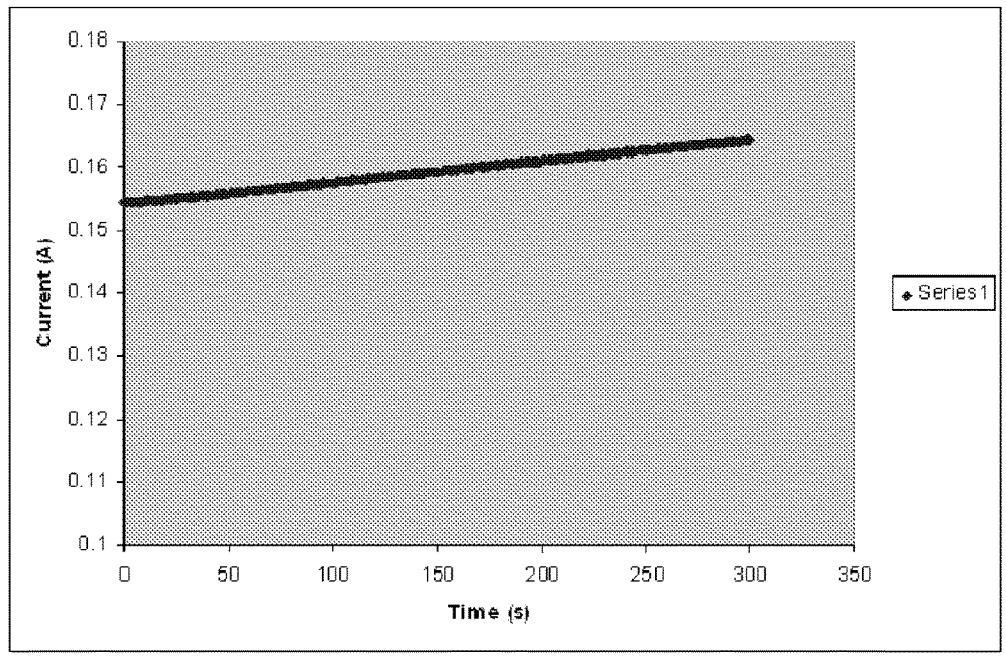
FIG. 7 shows the variation of current with time for the cell when operated potentiostatically at 650° C.
Figure 8:
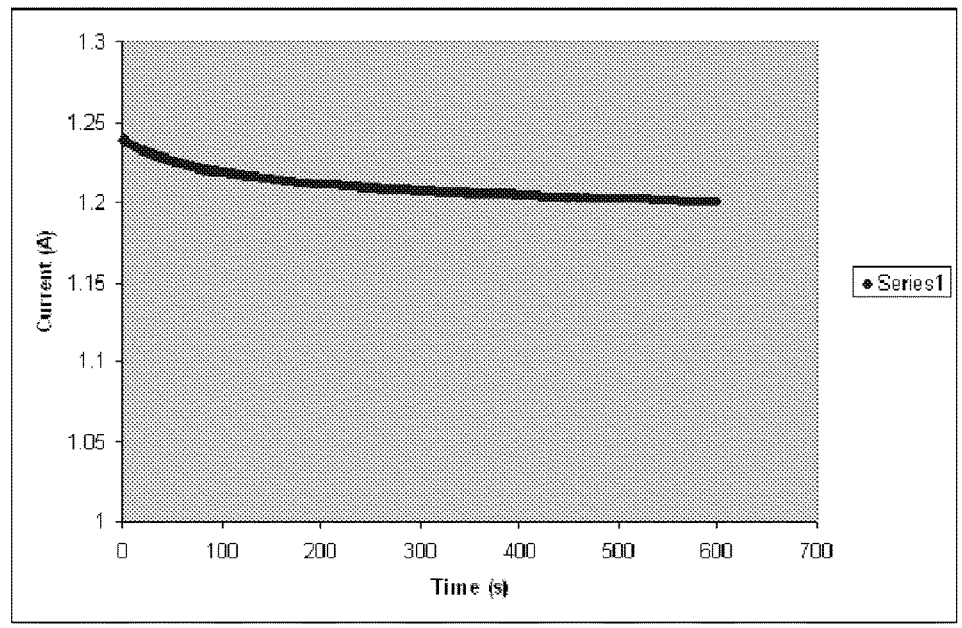
FIG. 8 shows the variation of current with time for the cell when operated potentiostatically at 750° C.

FIGS. 7 and 8 show the short term evolution of the current under a constant load at constant temperature. Both measurements were taken once the system 5 had been stabilised at a chosen temperature. FIG. 7 shows the short term current evolution of the system at 650° C. It can be seen from this that the current increases steadily with temperature. FIG. 8 shows the short term current evolution at 750° C., where the current undergoes a slight initial drop, before slowly reaching a stable value.

Figure 9:
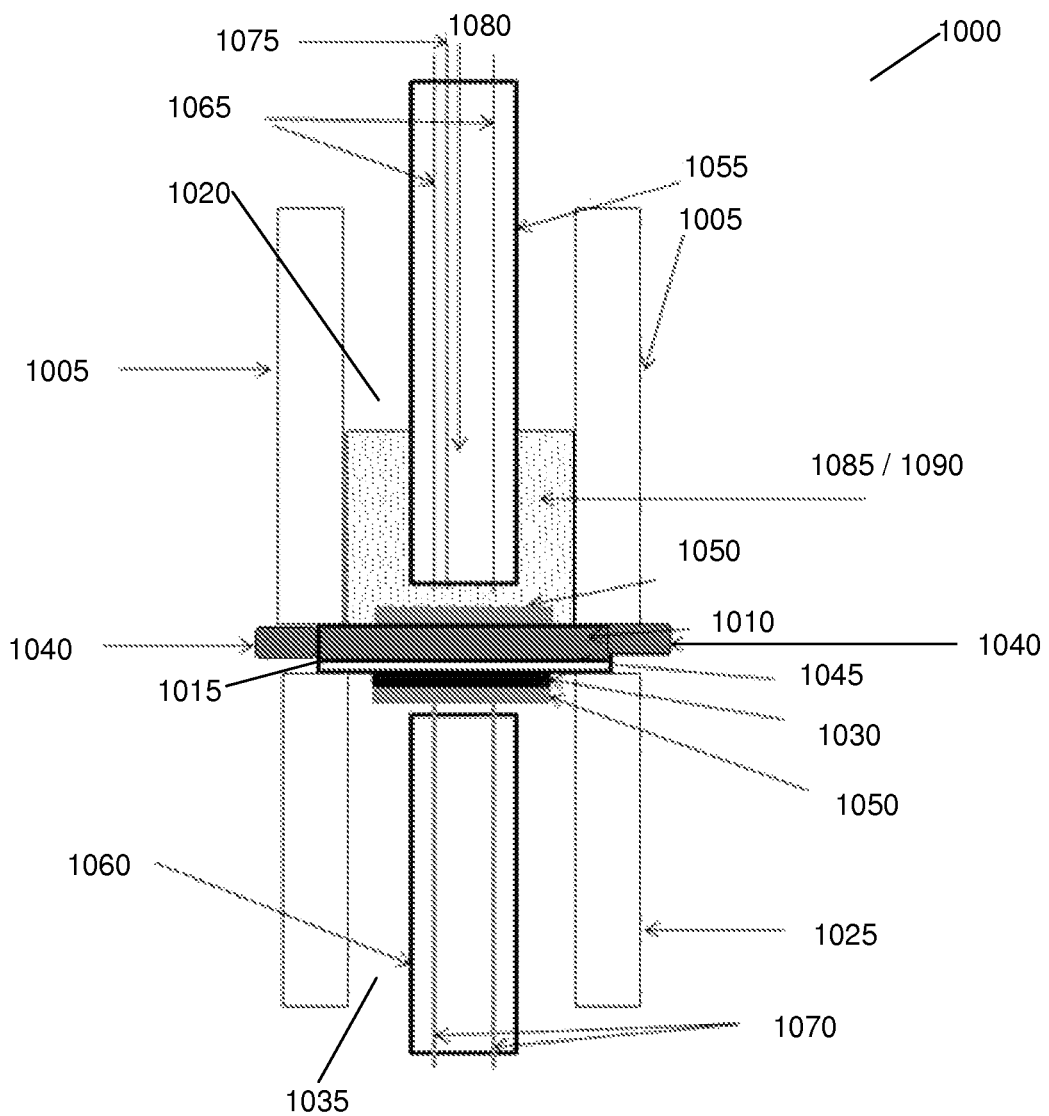
FIG. 9 is an electrochemical cell according to an embodiment of the invention.

An alternative hybrid direct carbon fuel cell system 1000 is shown in FIG. 9, which is used to illustrate the effect of certain operational parameters and design options on the performance of the system 1000.

The system 1000 comprises an electrochemical cell 1015, which in turn comprises a solid anode 1010, a solid electrolyte 1045 and a solid cathode 1030. Each of the anode 1010, electrolyte 1045 and cathode 1030 comprise solid oxide materials.

A first alumina tube 1005 is sealed to an anode 1010 of the electrochemical cell 1015 to form an anode chamber 1020. The first alumina tube 1005 is sealed to the cell 1015 using ceramic seals 1040. For example, a suitable seal can be formed from an alumina based paste such as Aremco® Ceramabond® 552.

A second alumina tube 1025 is fixed to the cathode 1030 of the cell 1015 to form a cathode chamber 1035.

In one embodiment, the electrochemical cell 1015 is an electrolyte supported cell, wherein a NiO—YSZ anode (in a 60/40 ratio) 1010 and a LSM-YSZ composite cathode 1030 are screen printed on opposing sides of a dry pressed 1 mm thick YSZ electrolyte 1045. The anode 1010 and electrolyte 1045 are calcined at 1350° C. for 2 hours then the cathode 1030 was calcined at 1100° C. for 2 hours.

In another embodiment, the cell 1015 is an anode supported cell having the same anode, electrolyte and cathode materials as the electrolyte supported cell. The anode supported cell 1015 is produced by slurry coating, wherein the anode materials are milled and formed into a 1 mm thick substrate. A slurry of YSZ that has been ball milled with an organic solution, binder and a polymer is coated onto the anode substrate. The anode 1010 and electrolyte 1045 are then sintered at 1350° C. for 5 hours. The cathode material is then screen printed onto a side of the electrolyte 1045 opposing the anode 1010 and calcined. In this embodiment, the anode 1010 is 1 mm thick whilst the electrolyte 1045 is 5 µm thick.

For both the anode supported cell and the electrolyte supported cell, a silver paste 1050 was painted on both the anode 1010 and cathode 1030 in order to act as a current collector.

Further alumina tubes 1055, 1060 are inserted inside the anode and cathode chambers 1020, 1035. Silver wires 1065, 1070 are run from the respective current collectors 1050 and through the further alumina tubes 1055, 1060, in order to provide external electrical connections for measurements. Control sensors 1075 such as thermocouples may also be routed through the further alumina tubes 1055, 1060. In addition, purge gas 1080 may also be provided via the further alumina tube 1055 on the anode side.

The anode chamber 1020 is filled with mixture of fuel 1085 and a second electrolyte 1090. The fuel 1085 is a pyrolized medium density fibreboard (p-mdf). The p-mdf is produced by pyrolizing mdf at 400° C. in nitrogen for 10 hours and has a composition 70.4% C, 4.6% N and 3.5% H, with the remainder anticipated to be oxygen. The second electrolyte 1090 comprises metal carbonates that are molten at operating temperatures (e.g. around 600 to 800° C.). In this instance, the second electrolyte 1090 comprises a 62:38 mole ratio eutectic blend of lithium and potassium carbonates. The fuel 1085 and second electrolyte 1090 are provided in a 4:1 wt ratio.

If the system 1000 comprises an electrolyte supported cell 1015 and operated without the second electrolyte 1090, i.e. such that the anode chamber 1020 contains only fuel 1085, then the total system resistance is over 11 Ωcm$^2$ at 750° C. An AC impedance spectrum collected with this system is shown in FIG. 10*a*.

Figure 10:
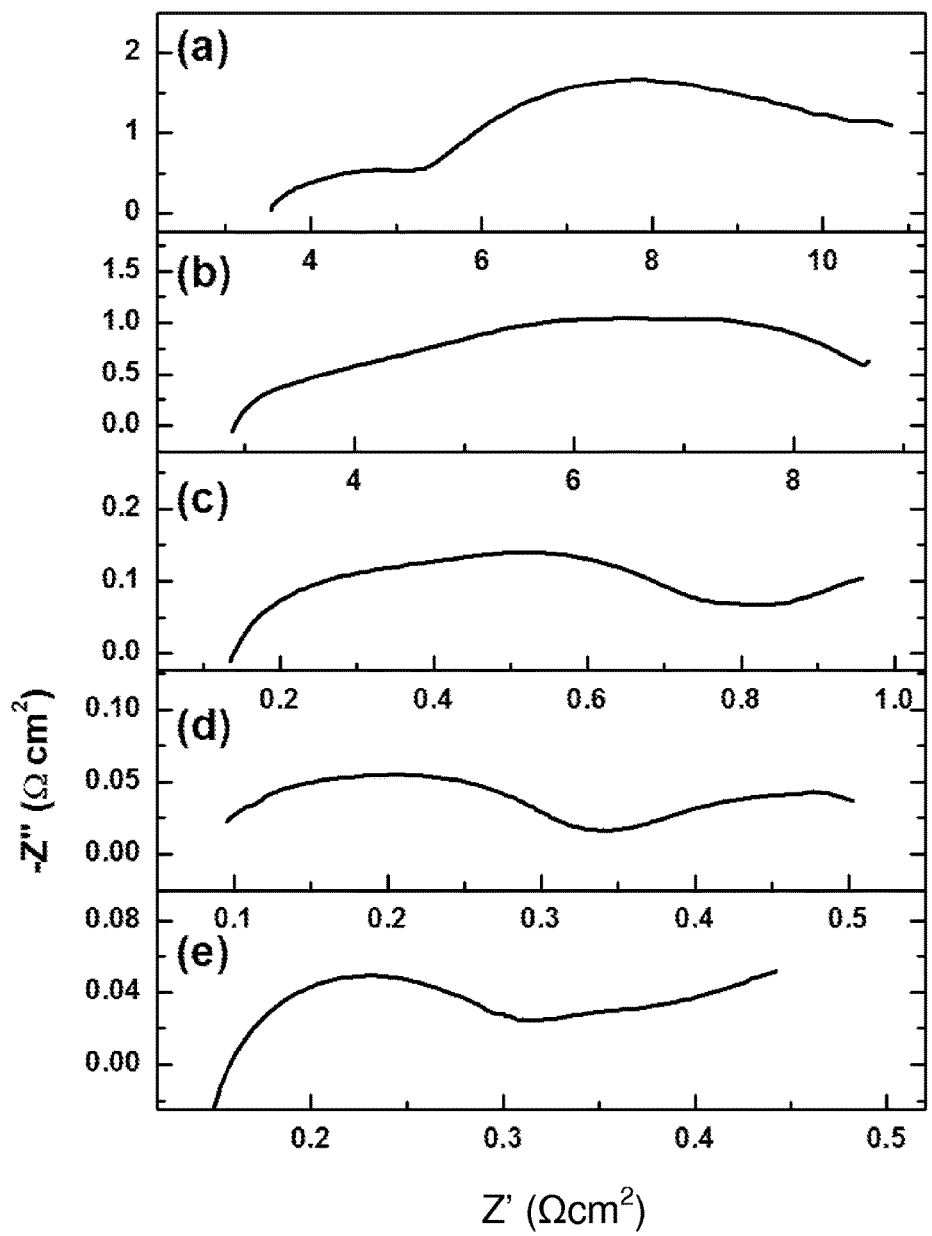
FIG. 10a is an AC impedance spectrum taken using a cell analogous to that shown in FIG. 9 at 750° C. in the absence of a second electrolyte, having nitrogen as a purge gas and wherein the cell has a 1 mm thick solid electrolyte and a cathode comprising LSM.
FIG. 10b is an AC impedance spectrum taken using a cell corresponding to that used in the collection of the spectrum of FIG. 10a but having a second (molten carbonate) electrolyte.
FIG. 10c is an AC impedance spectrum taken with a cell analogous to that used in the collection of the spectrum of FIG. 10b, but having a 5 µm thick, thin film electrolyte.
FIG. 10d is an AC impedance spectrum taken with a cell analogous to that used in the collection of the spectrum of FIG. 10c, but using $CO_2$ as the purge gas.
FIG. 10e is an AC impedance spectrum taken with a cell analogous to that used in the collection of the spectrum of FIG. 10d, but wherein the cell has a cathode comprising LSC.

FIG. 10*b* shows an AC impedance spectrum collected using the above system when the second electrolyte 1090 is provided (i.e. the system is a hybrid system). In this case, the total cell resistance reduces to 8.7 Ωcm$^2$ at 750° C.

If the cell 1015 is an anode supported cell rather than an electrolyte supported cell, as described above, such that the electrolyte 1045 is much thinner (e.g. In the order of microns rather than millimeters, in this case 5 µm), the performance improves markedly, increasing from 70 mW·cm$^{-2}$ for the electrolyte supported cell to 390 mW·cm$^{-2}$ for the corresponding anode supported cell under the same conditions. An AC spectrum collected using the system 1000 having an anode supported cell 1015 is shown in FIG. 10*c*

Figure 11:
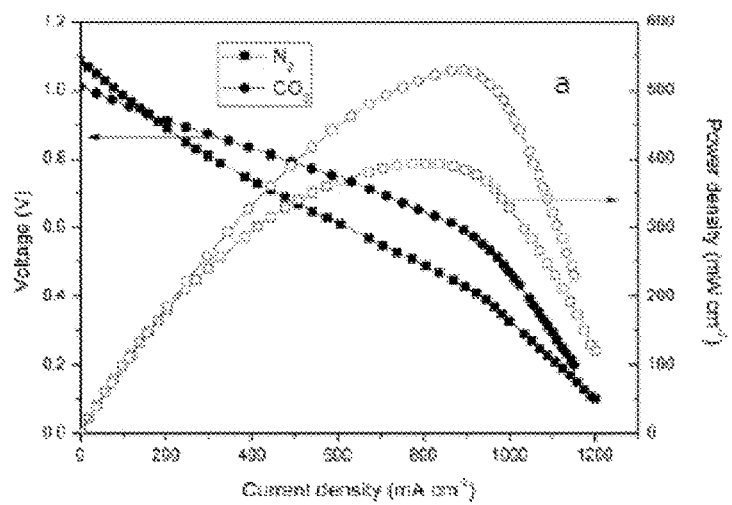
FIG. 11 shows cell performance plots obtained at 750° C. using cells as described above in relation to FIGS. 10c and 10d.

For each of the above measurements, the purge gas used is nitrogen. As shown in FIG. 11, if carbon dioxide is substituted for nitrogen as the purge gas, then the performance of the cell increases further, in this case from 390 mW·cm$^{-2}$ to 500 mW·cm$^{-2}$ for the system comprising an anode supported cell. An AC spectrum of the system 1000 when purged with $CO_2$ is shown in FIG. 10*d*. Without wanting to be bound by any specific theory, the higher performance under $CO_2$ may be due to enhanced electrochemical processes or carbonate stability.

The present inventors have found that the resistance of the cathode 1035 contributes a large proportion of the total resistance of the anode supported system at 750° C. When a cell having a lanthanum doped strontium cobalt (LSC) cathode with a protective interlayer is used instead of the corresponding cell having cathode comprising a composite of LSM/YSZ, the cell performance is improved. In this example, the interlayer comprises gadolinium doped ceria. The protective interlayer serves to prevent reaction between the LSC and the YSZ of the electrolyte.

Figure 12:
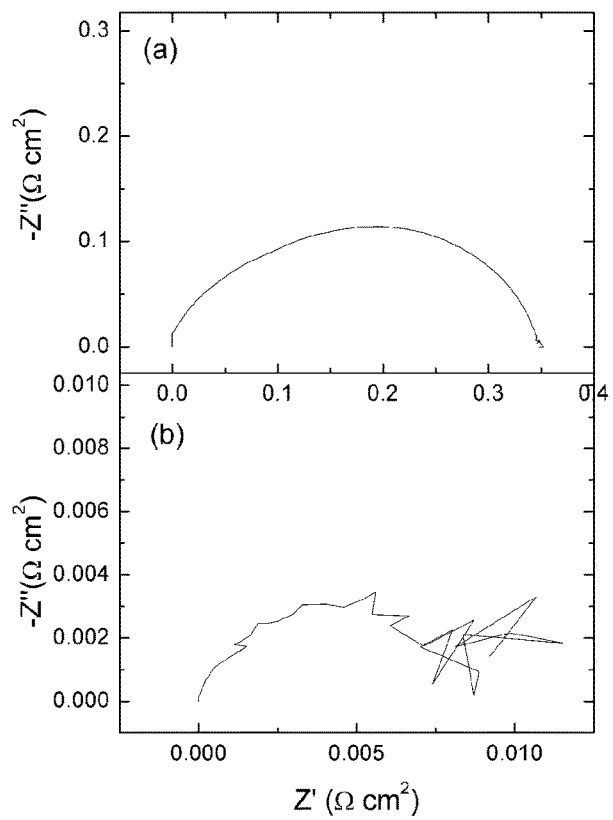
FIG. 12a is an AC impedance spectrum with the ohmic resistance subtracted collected using a symmetrical cell having a composite LSM/YSZ (50:50 weight ratio) electrode on a YSZ electrolyte.
FIG. 12b is an AC impedance spectrum with the ohmic resistance subtracted collected using a symmetrical cell having a LSC electrode on a Gd-doped ceria electrolyte.
Figure 13:
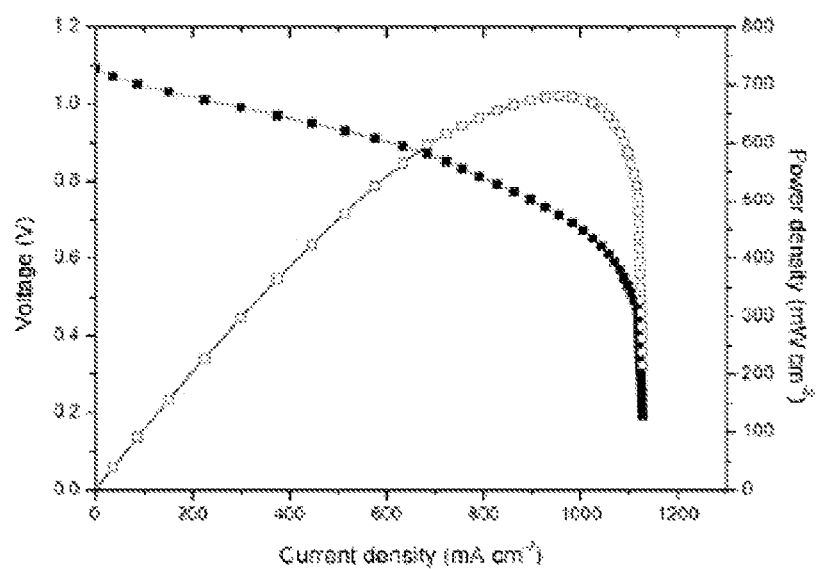
FIG. 13 shows current-voltage characteristics of a cell having a LSC cathode, a 5 µm thick YSZ electrolyte, a nickel cermet anode and a $Ce_{0.9}Gd_{0.1}O_2$ interlayer between the cathode and electrolyte at 750° C.

FIGS. 12*a* and 12*b* show the effect of choice of cathode 1035 and solid electrolyte 1045 material. In particular, FIG. 12*a* shows an AC impedance spectrum of a system 1000 having the general structure shown in FIG. 9, where the cathode 1035 comprises lanthanum doped strontium manganite $(La_{0.8}Sr_{0.2})_{0.95}MnO_3$ (LSM) and YSZ in a 50:50 wt. % ratio, whilst FIG. 12*b* shows a corresponding system where the cathode 1035 comprises lanthanum doped strontium cobalt $La_{0.8}Sr_{0.4}CoO_{3-\delta}$ in conjunction with a Ga-doped ceria interlayer. As shown in FIG. 13, the system 1000 having the LSC based cathode 1035 was found to have improved performance of 680 mW·cm$^{-2}$ at 750° C., compared with the 500 mW·cm$^{-2}$ achieved by the corresponding LSM based system 1000 under similar conditions.

Figure 14:
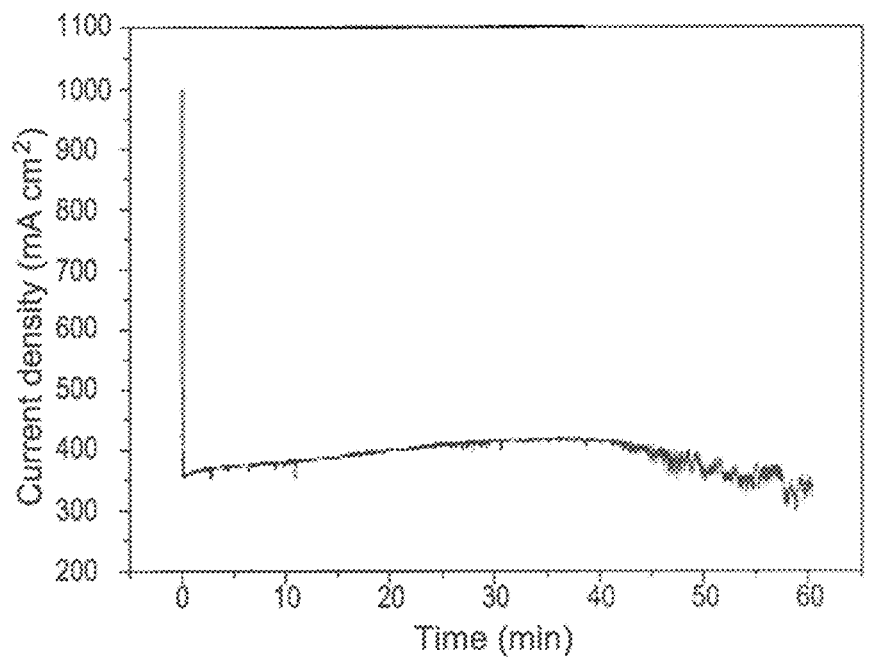
FIG. 14 shows a plot of current density over time obtained using the cell described in relation to FIG. 13.

FIG. 14 shows the stability of the system 1000 in the short term when run in a "battery-like" mode, wherein, a single batch of fuel 1085 is provided and no further fuel 1085 is supplied. This shows that the system 1000 can be run at over 300 mA·cm$^{-2}$ in this configuration for 1 hr without degradation. Performance drops off after this time. The drop off in performance depends on the consumption rate of carbon. Stirring has also been found to recover performance. Therefore, longer term performance is anticipated for systems 1000 having means for supplying fuel and/or means for agitating the second electrolyte 1090/fuel 1085.

Figure 15:
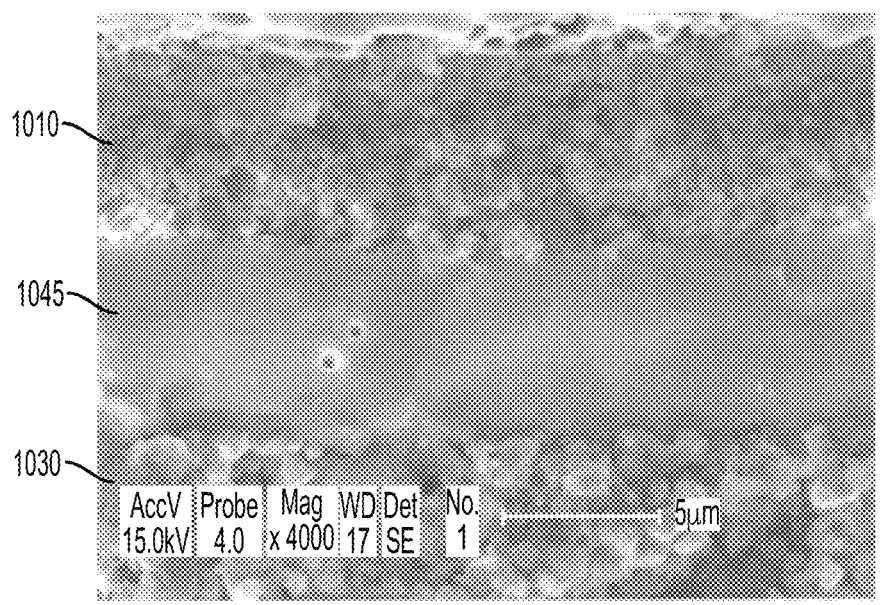
FIG. 15 is a cross sectional SEM image of cell comprising a Ni/YSZ anode, a 5 µm thick YSZ electrolyte and a LSM/YSZ composite cathode.

The present inventors have surprisingly found that thin YSZ solid electrolyte 1045 that are less than 10 µm thick, show no significant change or failure after 10 hrs of operation, as shown in FIG. 15. The understanding in the art suggests that molten carbonate electrolyte 1090 and YSZ electrolyte 1045 would react, for example, to form lithium zirconate.

It has been found by the present inventors that cubic compositions of YSZ have reduced lithium zirconate formation relative to other configurations, such as tetragonal. Again, without wishing to be bound by any particular theory, this might be due to a higher yttrium content and/or larger grain size of the cubic material relative to tetragonal material.

Figure 16A:
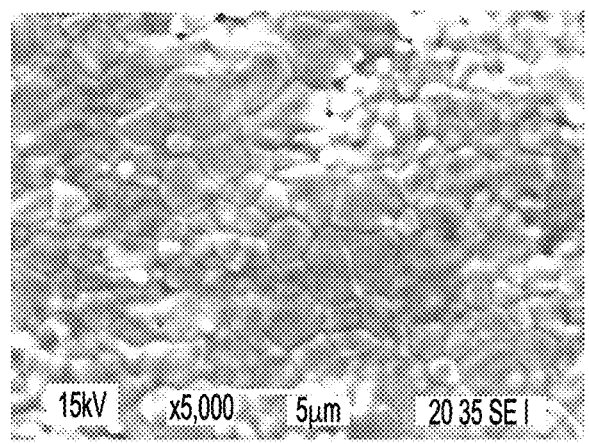
FIG. 16a is a SEM image of the surface of freshly prepared YSZ.
Figure 16B:
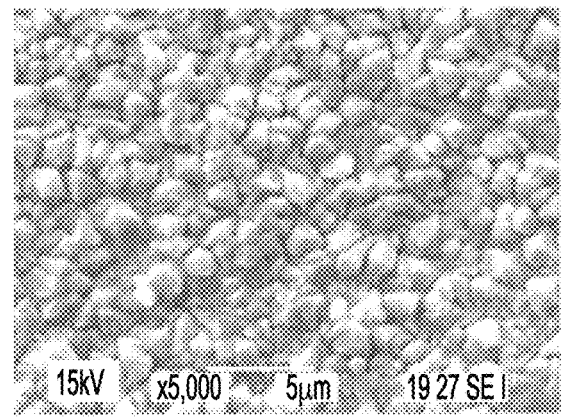
FIG. 16b is a SEM image of the YSZ shown in FIG. 16a after being etched in lithium and potassium carbonate at 700° C. for 10 hours.
Figure 17:
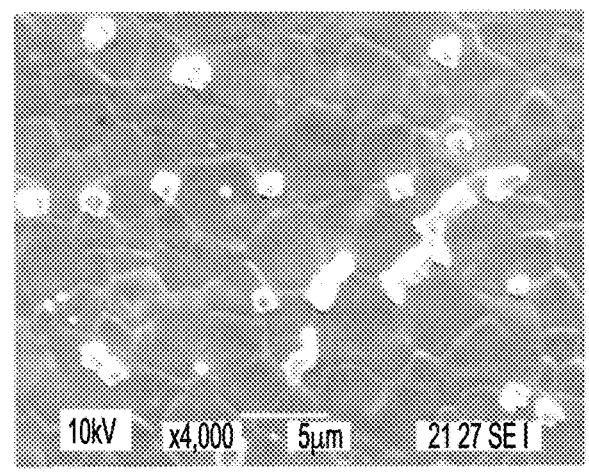
FIG. 17 is a SEM image of the surface of a YSZ membrane that has been used as an electrolyte in the cell of FIG. 9, wherein the surface has been subjected to lithium and potassium carbonate at 700° C. for 10 hours and electrochemical operation of the cell and wherein the shown portion of membrane was located near the edge of the anode.

In addition, cubic zirconias (8 mol % YSZ) when aged with molten carbonate show some etching and surface reorganisation (as shown in FIGS. 16*a* and 16*b*, where FIG. 16*a* shows a SEM image of a freshly prepared surface of cubic YSZ and FIG. 16*b* shows the same surface after etching in a eutectic mix of lithium and potassium carbonate at 700° C. for 10 hours. For corresponding samples that have been aged in the above system 1000 under operation under electrical load (e.g. as shown in FIG. 17, which shows a SEM image of a YSZ membrane surface that has been used in a cell that has undergone electrochemical measurement and has been immersed in a eutectic lithium/potassium carbonate electrolyte for 10 hours) little evidence of surface change is detected.

As such, it seems that a number of factors may help to stabilise the YSZ, including higher yttria content, lower impurity content, high availability of YSZ in the thick anode support and application of potential and/or current.

Although various embodiments of fuel cell system 5, 1000 have been described, it will be appreciated that features of each of the above systems 5, 1000 are interchangeable. For example, the choice of considerations such as purge gas, electrolyte material and/or thickness, and/or cathode materials described in relation to the embodiments shown in FIG. 9 apply equally to the embodiments described in relation to FIG. 1 and the sealing and anode housing embodiments described in relation to FIG. 1 may apply equally to embodiments described in relation to FIG. 9. Advantageously, features of the embodiments described in relation to FIGS. 1 and 9 can be combined to produce a commercial scale fuel cell system that shows good sealing and electrical performance properties with a long operational life.

A skilled person will appreciate that variations of the disclosed arrangements are possible without departing from the invention. For example, whilst the cell housing 15 described herein is in a cylindrical configuration, it will be appreciated that other configurations that define a hollow chamber may be used, such as a box like configuration. Furthermore, whilst the solid anode 20 has been described as comprising Ni-YSZ, the electrolyte 25 as comprising YSZ and the cathode 30 as comprising LSM, it will be appreciated that other anode, electrolyte and/or cathode chemistries may be used. For example, the anode may comprise a cermet and/or the cathode may comprise lanthanum doped strontium cobalt oxide, preferably with a protective layer such as gadolinium doped ceria between the cathode and electrolyte. Furthermore, whilst the system 5 has been described in terms of using carbon fuel 120 in the form of p-mdf, it will be appreciated that other solid fuels may also be used, such as coal or coke. Indeed, it will be appreciated that the system may even by conceivably used with non carbonaceous solid fuels. Accordingly the above description of the specific embodiment is made by way of example only and not for the purposes of limitation. It will be clear to the skilled person that minor modifications may be made without significant changes to the operation described.

The invention claimed is:

1. A direct carbon fuel cell system, the system comprising:
   an electrochemical cell, the electrochemical cell comprising a cathode, a solid state first electrolyte and an anode;
   an anode housing that at least partially defines an anode chamber at least one of containing or being configured to receive a second electrolyte and a fuel;
   a cathode housing that comprises one or more openings for at least one of admitting or expelling an oxidant; and
   at least one anode chamber seal and at least one cathode seal,
   wherein:
      the electrochemical cell is provided between at least part of the anode housing and at least part of the cathode housing, with the anode being provided toward the anode housing and the cathode being provided toward the cathode housing;
      the at least one anode chamber seal is provided between the anode housing and at least one of the electrochemical cell, the cathode housing, or the cathode seal;
      at least one cathode seal is provided between the cathode housing and at least one of the electrochemical cell, the anode housing, or the anode seal; and
      the second electrolyte and fuel are provided in the anode chamber, the amount of the second electrolyte being at least one of: (a) less than or equal to 20 mol %; or (b) less than 1:1 weight ratio relative to the fuel.

2. A direct carbon fuel cell system according to claim 1, wherein the anode housing comprises stainless steel.

3. The system of claim 1, wherein:
   the second electrolyte is at least partially molten under operating conditions; and
   the cell is configured for operation at temperatures between 600 and 850° C.

4. The system of claim 1, wherein the anode, cathode and first electrolyte comprise solid oxide materials.

5. The system according to claim 1, wherein the electrochemical cell is a planar cell.

6. The system according to claim 1, wherein the anode chamber comprises at least one gas inlet or outlet, for at least one of supplying or exhausting gas, the system being configured to provide gas comprising at least one of carbon dioxide, helium, argon, nitrogen, or steam.

7. The system according to claim 1, further comprising a cathode side current collector, wherein the cathode side current collector comprises at least one of a silver or silver coated stainless steel wire or mesh and/or a connector is provided between the cathode and the cathode side current collector, wherein the connector comprises a solid oxide material.

8. The system according to claim 1, wherein the cathode comprises at least one of lanthanum strontium manganite (LSM), lanthanum doped strontium cobalt oxide (LSC) or a mixed ionic/electronic conducting ceramic with the formula $(A_{1-x}Sr_x)_{1-y}BO_{3-\delta}$, where A may be lanthanum or barium, and B may be manganese, iron, cobalt or a combination thereof and/or yttria stabilised zirconia (YSZ).

9. The system according to claim 1, wherein the system comprises an interlayer on or adjacent the cathode, the interlayer having a material composition that differs from both the first electrolyte and cathode.

10. The system according to claim 1, wherein the anode comprises at least one of nickel, platinum, palladium, zinc, iron, ceria, composite nickel oxide and YSZ, nickel cermet.

11. The system according to claim 1, wherein the second electrolyte comprises at least one of lithium hydroxide, sodium hydroxide, potassium hydroxide or mixture thereof; lithium carbonate, sodium carbonate, potassium carbonate or mixture thereof.

12. The system according to claim 1, wherein the fuel comprises at least one of pyrolysed medium density fibreboard (p-MDF), coal, coke, graphite, carbon black or activated carbon.

13. The system according to claim 1, wherein the anode chamber is provided with an agitator, or stirrer, or subject to sonification.

14. The system according to claim 1, wherein the system comprises a feeder for feeding fuel and/or second electrolyte to the anode chamber.

15. A method of assembling the direct carbon fuel cell system of claim 1, the anode chamber of the system at least one of containing or being configured to receive a second electrolyte and a fuel, the method comprising the step of compression sealing an electrochemical cell between the anode housing and the cathode housing, wherein at least one seal is provided between the anode chamber and/or the electrochemical cell and/or the cathode chamber.

16. The system according to claim 1, wherein the first electrolyte and/or anode and/or cathode are provided using a thin film process.

17. The system according to claim 16, wherein the first electrolyte is less than 50 μm thick.

18. The system according to claim 1, wherein:
   the anode chamber is provided with at least one support member extending from the anode housing for supporting the electrochemical cell.

19. The system according to claim 18, wherein each support member comprises a pillar.

20. The system according to claim 19, wherein the support member(s) extend to a position substantially level or planar with an aperture defined by an end of a wall of the anode chamber.

21. The system according to claim 1, wherein the electrochemical cell is at least one of fixed or clamped between the cathode housing and the anode housing.

22. The system according to claim 21, wherein an anode side current collector is provided on the anode side of the electrochemical cell and an electrical connector extends from the anode side current collector, between at least first and second anode seals, so as to extend externally from the anode chamber.

23. The system according to claim 21, wherein at least one of the anode chamber seal or cathode seal comprise electrically insulating seals.

24. The system according to claim 21, wherein at least one of the at least one anode chamber seal or cathode seal comprise a mineral seal.

25. The system according to claim 21, wherein at least one of the anode chamber seal or cathode seal comprise at least one of steatite, vermiculite, a vermiculite derivative, a ceramic, or a ceramic adhesive.

26. The system according to claim 1, wherein the cell is at least one of compression sealed or sealable.

27. The system according to claim 26, wherein at least two bolt holes are provided in at least one of the anode or cathode housings, and a sleeve of electrically insulating material is provided in at least one bolt hole, such that the insulating sleeves are located or seatable between at least one of the anode or cathode housing and any bolts provided in the bolt holes.

28. The system according to claim 1, wherein the first electrolyte comprises at least one of hafnia, zirconia, alumina, yttria, ceria, lanthanum gallate.

29. The system of claim 28, wherein the first electrolyte comprises a yttria stabilised zirconia and has a cubic crystal structure.

30. The system according to claim 1, wherein the anode chamber contains or is configured to receive a particulate or powdered catalyst, that comprises at least one of nickel, platinum, palladium, copper and/or iron.

31. The system according to claim 30, wherein the catalyst is at least 10 weight % based on 100 weight % of the electrolyte.

32. A stack or assembly comprising at least two systems according to claim 1, the at least two systems being linked by a common fuel supply and/or exhaust and/or a common oxidant supply and/or exhaust and/or be electrically connected.

33. A method of operation of at least one of an electrochemical cell comprising a cathode, a solid state first electrolyte and an anode or the stack or assembly of claim 32 in order to produce electrical power, the method comprising connecting the electrochemical cell and/or stack or assembly to an electrical load and/or supplying fuel to the anode chamber and/or oxidant to the cathode.

34. The method of claim 33, wherein the method comprises supplying purge gas to the anode chamber, the purge gas comprising at least one of nitrogen, argon, or carbon dioxide.

* * * * *